United States Patent [19]

Stansfield

[11] 4,012,826

[45] Mar. 22, 1977

[54] BOLT TIGHTENING APPARATUS AND METHOD

[75] Inventor: Fred Stansfield, Oldham, England

[73] Assignee: Doncasters Moorside Limited, Oldham, England

[22] Filed: May 19, 1976

[21] Appl. No.: 687,946

[30] Foreign Application Priority Data

Mar. 18, 1976 United Kingdom ............. 11006/76

[52] U.S. Cl. .................................... 29/446; 29/526; 81/57.38; 254/29 A

[51] Int. Cl.$^2$ .................... B23P 11/02; B25B 29/02; E21B 19/00

[58] Field of Search .................... 29/446, 428, 526; 52/758 F; 81/57.38; 254/29 A

[56] References Cited

UNITED STATES PATENTS

| | | | |
|---|---|---|---|
| 2,866,370 | 12/1958 | Biach | 81/57.38 |
| 3,722,332 | 3/1973 | Jones | 81/57.38 |
| 3,749,362 | 7/1973 | O'Connor | 254/29 A |
| 3,847,041 | 11/1974 | Meschonat et al. | 81/57.38 |
| 3,877,326 | 4/1975 | Kock | 81/57.38 |
| 3,965,565 | 6/1976 | Fujii | 29/446 |

FOREIGN PATENTS OR APPLICATIONS

| | | | |
|---|---|---|---|
| 1,390,012 | 4/1975 | United Kingdom | 81/57.38 |

*Primary Examiner*—Charlie T. Moon
*Attorney, Agent, or Firm*—Sherman H. Barber

[57] ABSTRACT

Apparatus for pre-tensioning a series of screwthreaded fasteners comprising an even number of such fasteners arranged on a common pitch circle; the apparatus including a ring member adapted to apply pre-tensioning forces to alternate fasteners by way of adaptors applied to said fasteners, the ring member being supported above the remaining fasteners by way of respective hydraulic piston and cylinder arrangements.

5 Claims, 5 Drawing Figures

BOLT TIGHTENING APPARATUS AND METHOD

Figure 1:
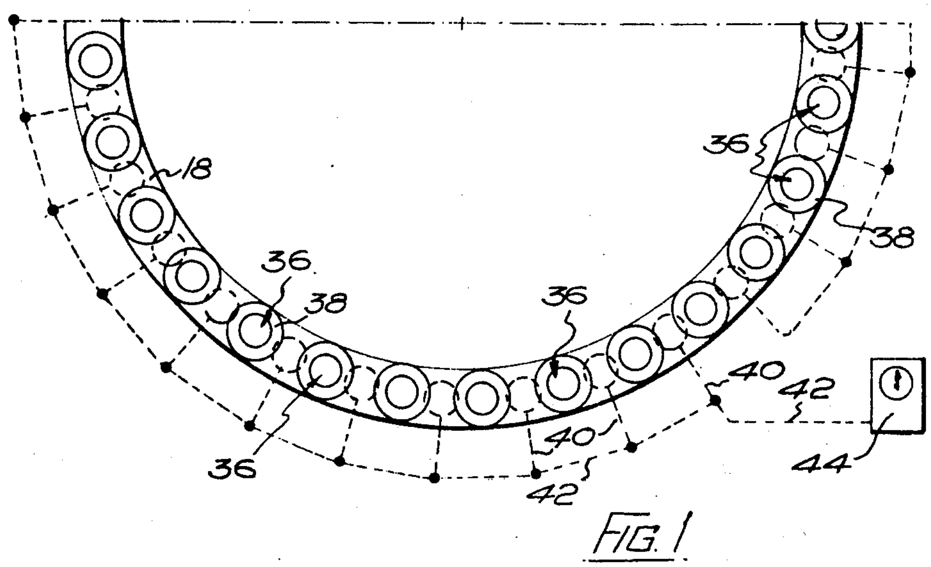

The invention relates to bolt tightening apparatus and has for its object to provide an improvement therein.

It is well known to pre-tension bolts and studs of, inter alia, steam turbine casing assemblies before restraining nuts are finally tightened in position so that, when the pre-tensioning means are released, stress is transferred to said bolts or studs, as the case may be, whereby the assembly concerned is very tightly bolted together. The same means have been employed when it has been required to looses the bolts or studs, the latter having been stretched before any attempt has been made to slacken off the restraining nuts. One way in which this has previously been done has involved the use of a bridge member and means for supporting the bridge member on the two bolts or studs flanking one end of a bolt or stud which is to be pretensioned by said bridge member. However, by these means it will be understood that it has only been possible in a single operation to pre-tension every third bolt or stud in a series of such bolts or studs even if a series of such bridge members have been used.

According to one aspect of the invention, there is provided a method of pre-tensioning a series of bolts or studs comprising an even number of such bolts or studs arranged on a common pitch circle, the method including the steps of applying a tension to alternate bolts or studs of the series of bolts or studs by means of a ring member supported above the remaining bolts or studs and by means of a plurality of piston and cylinder arrangements associated with said ring member and acting against respective spacer members surrounding said remaining bolts or studs, and of subsequently repositioning the ring member so that it can be supported above the already tightened bolts or studs and applying a tension to said remaining bolts or studs by means of said ring member and the piston and cylinder assemblies associated with said ring member.

According to another aspect of the invention, there is provided bolt or stud tensioning apparatus including a ring member adapted to be supported at equally spaced intervals above alternate ones of a series of bolts or studs comprising an even number of such bolts or studs by a plurality of piston and cylinder assemblies associated with said ring member, the latter being provided with a plurality of holes alternating with said piston and cylinder assemblies and accommodating upstanding rod portions of internally screwthreaded adaptors which can be screwed down on the bolts or studs alternating with those above which the ring member is supported. Each piston and cylinder arrangement will preferably include a cylinder machined in the underside of the ring member. Each piston and cylinder arrangement will preferably include a cylinder machined in the underside of the ring member. Each piston and cylinder arrangement will preferably include also a piston, a PTFE disc overlying the piston, and a rubber sealing member overlying said disc. The apparatus will preferably include also a plurality of cap spacers and a plurality of cylindrical spacers, the latter being of the same thickness as nuts which are to be tightened on the pretensioned bolts or studs, the arrangement in this case being such that in a first of two tightening operations the ring members can be supported above alternate bolts or studs on said cap spacers and cylindrical spacers, and in a second of the two tightening operations the ring member can be supported above the already tightened bolts or studs on the cap spacers mounted upon the already tightened nuts. Screwthreaded abutment members may be provided to engage screwthreaded upper ends of said rod portions of the adaptors and to overlie the ring member.

Figure 2:
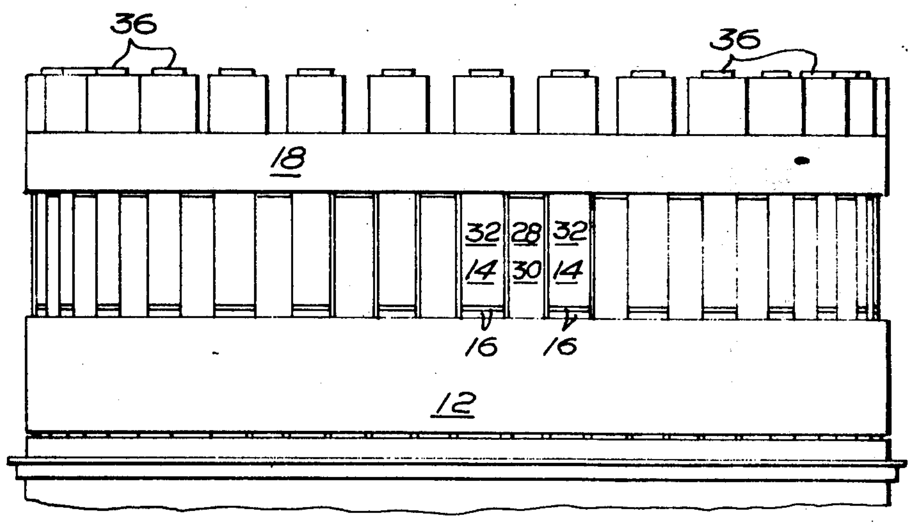
Figure 3:
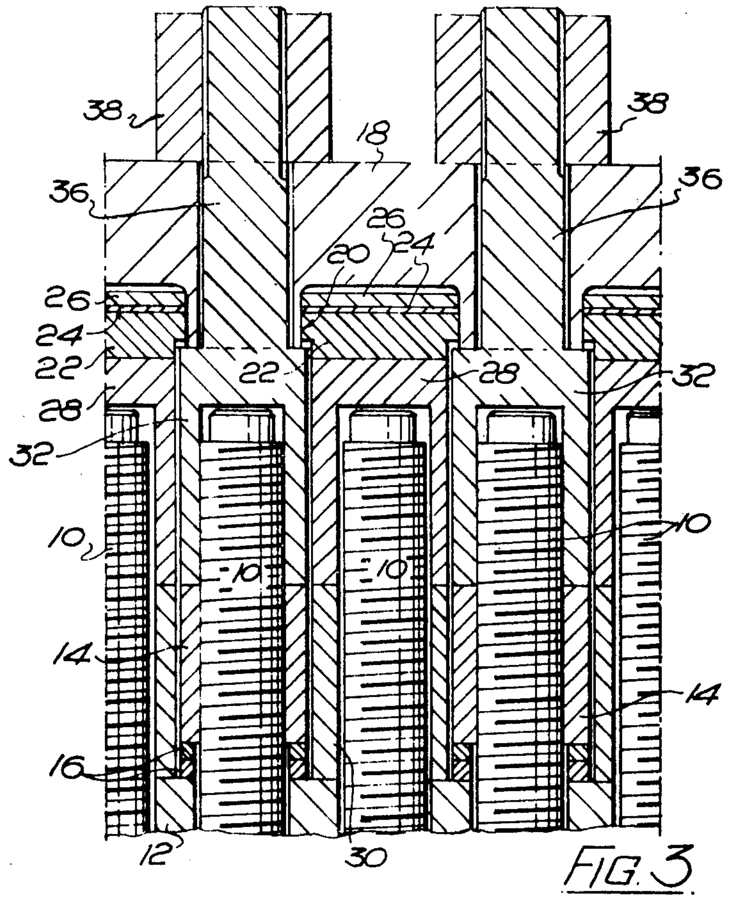
Figure 4:
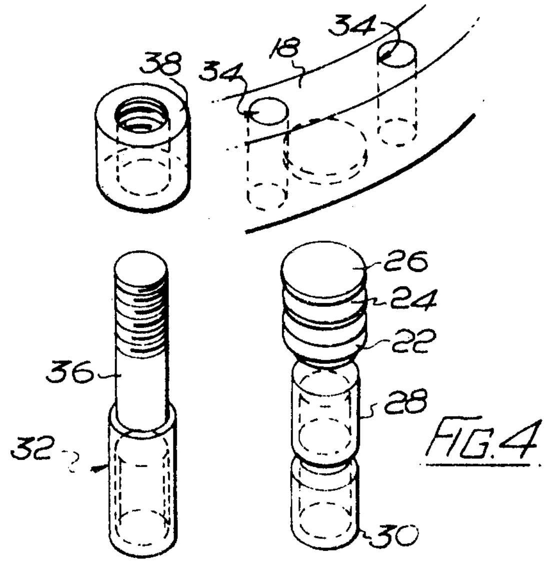
Figure 5:
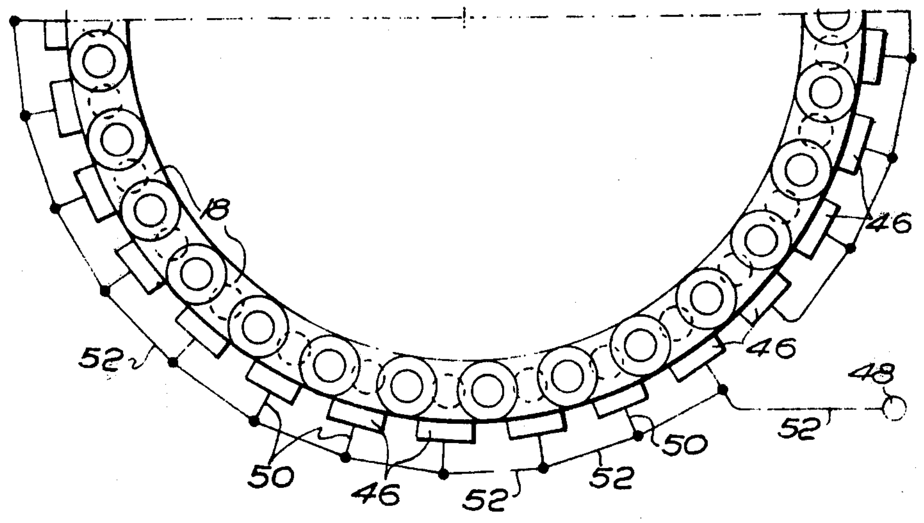

In order that the invention may be fully understood and readily carried into effect, the same will now be described, by way of example only, with reference to the accompanying drawings, of which:

FIG. 1 is a plan view of bolt or stud tensioning apparatus embodying the invention in position on a ring of studs of a pressure vessel, FIG. 2 is a side view thereof, FIG. 3 is a sectional developed side view through several of the studs and the tensioning apparatus associated therewith, FIG. 4 is an exploded view of the component parts of the tensioning apparatus, and FIG. 5 is a view similar to FIG. 1 which illustrates an alternative method of operating the apparatus to produce a tension in the bolts or studs.

Referring now to the drawings, FIGS. 1, 2 and 3 show a plurality of studs 10 extending through the flange 12 of a pressure vessel and provided with restraining nuts 14 and pairs of concave washers 16 through which tightening forces are to be transmitted to the flange. (Alternate studs are shown in FIG. 3 to be provided with the nuts and washers and the remaining studs are shown to be associated with tensioning apparatus embodying the invention).

The tensioning apparatus includes a ring member 18 supported above alternate studs by means of hydraulic piston and cylinder arrangements each one of which is constituted by a shallow cylinder 20 machined in the underside of the ring member, a piston 22, a PTFE disc 24 overlying the piston, and a rubber sealing member 26 overlying said disc. The piston of each arrangement is shown to act against a respective so-called cap spacer 28 and a cylindrical spacer 30 which abuts against the flange 12 (the spacer 30 being the same depth as a nut 14). The ring member is designed so that it can apply pre-tensioning forces to alternate studs (that is to say the studs alternating with those above which it is supported) by way of internally screwthreaded adaptors 32 which are screwed down on said studs, overlying the nuts 14. The ring member is provided with holes 34 through which upstanding rod portions 36 of the adaptors extend. Screwthreaded abutment members 38 which engage screwthreaded upper ends of said rod portions overlie the ring member.

The arrangement is such that the ring member can be supported on alternate studs, so that the remaining studs can be pre-tensioned and their nuts tightened, and a single re-positioning of said ring member is then required so that it can be supported on the nuts of the already tightened studs (that is to say, the cap spacers 28 against which the pistons act then being mounted directly upon said already tightened nuts 14 instead of upon the spacers 30) for the pre-tensioning of the first mentioned alternate studs and the tightening of their nuts. In FIGS. 2 and 3 the first of the two tightening operations is taking place or is about to take place.

It will of course be understood that it is preferable for all the hydraulic piston and cylinder arrangements to be connected together in a common hydraulic circuit so that all the studs being pre-stressed at that time are pre-stressed equally. It will be understood that when the ring member has been re-positioned in readiness for the pre-tensioning and tightening of the second set of studs, it is important that the same hydraulic pressure as before is established in the piston and cylinder arrangements forming part of the stud tensioning apparatus so that the second set of studs being pre-stressed are pre-stressed by exactly the same amount as the first set.

In FIG. 1 it will be seen that all the hydraulic piston and cylinder arrangements are connected together by means of conduits 40 and 42 and that they can all be pressurised by means of a common pump 44. In FIG. 5, however, there is illustrated an alternative arrangement in which respective air powered pumps 46 are associated with respective cylinders formed in the ring member 18 for pressurising the piston and cylinder arrangement, said air powered pumps being connected together and to a common source 48 of air under pressure by way of conduits 50 and 52.

Various other modifications may be made without department from the scope of the invention.

What I claim and desire to secure by Letters Patent is:

1. A method of pre-tensioning a series of screwthreaded fasteners comprising an even number of such fasteners arranged on a commom pitch circle, the method including the steps of applying a tension to alternate fasteners of the series of fasteners by means of a ring member supported above the remaining fasteners and by means of a plurality of piston and cylinder arrangements associated with said ring member and acting against respective spacer members surrounding said remaining fasteners tightening the nuts on the tensioned alternate fasteners to retain tension on said alternate fasteners, subsequently repositioning the ring member so that it can be supported above the already tightened fasteners and applying a tension to said remaining fasteners by means of said ring member and the piston and cylinder assemblies associated with said ring member, and tightening the nuts on the tensioned remaining fasteners to retain the tension on said remaining fasteners.

2. Apparatus for tensioning a plurality of screwthreaded fasteners, wherein the improvement comprises:

a. a plurality of screwthreaded fasteners arranged on a common pitch circle and comprising an even number of such fasteners;

b. first means coacting with each one of alternate fasteners for applying a tensile force to each of said alternate fasteners;

c. a ring member coacting with said first means and supported above the remaining fasteners to exert tensile forces on said alternate fasteners;

d. second means for maintaining said ring member in such coacting relation with said first means;

e. abutment means overlying respective remaining fasteners and disposed to support said ring member above said remaining fasteners; and f. third means coacting with said ring member and with said abutment means and creating forces in said ring member that coact with said first means and thereby exert tensile forces in said alternate fasteners.

3. Apparatus for tensioning a plurality of screwthreaded fasteners, wherein the improvement comprises:

a. a plurality of screwthreaded fasteners arranged on a common pitch circle and comprisng an even number of such fasteners;

b. an adaptor threaded onto each one of alternate fasteners for applying a tensile force to each of said alternate fasteners;

c. a ring member coacting with the adaptors threaded onto the respective alternate fasteners to exert tensile forces on said alternate fasteners;

d. means securing said ring member in such coacting relation;

e. abutment means overlying respective remaining fasteners and disposed to support said ring member above said remaining fasteners;

f. respective hydraulic piston and cylinder arrangements coacting with said ring member and with respective abutment means and creating forces in said ring member that exert tensile forces in said alternate fasteners; and g. means for actuating said hydraulic piston and cylinder arrangements for applying equal tensile forces in said alternate fasteners.

4. Apparatus as claimed in claim 2, including:

a. a plurality of cap spacers and a plurality of cylindrical spacers which together constitute the abutment means overlying respective remaining fasteners and disposed to support the ring member above said remaining fasteners.

5. The invention of claim 3, including:

a. means for exerting equal forces in the ring member that coact with the first means and thereby exert equal tensile forces in the alternate fasteners.

* * * * *